Patented Apr. 30, 1929.

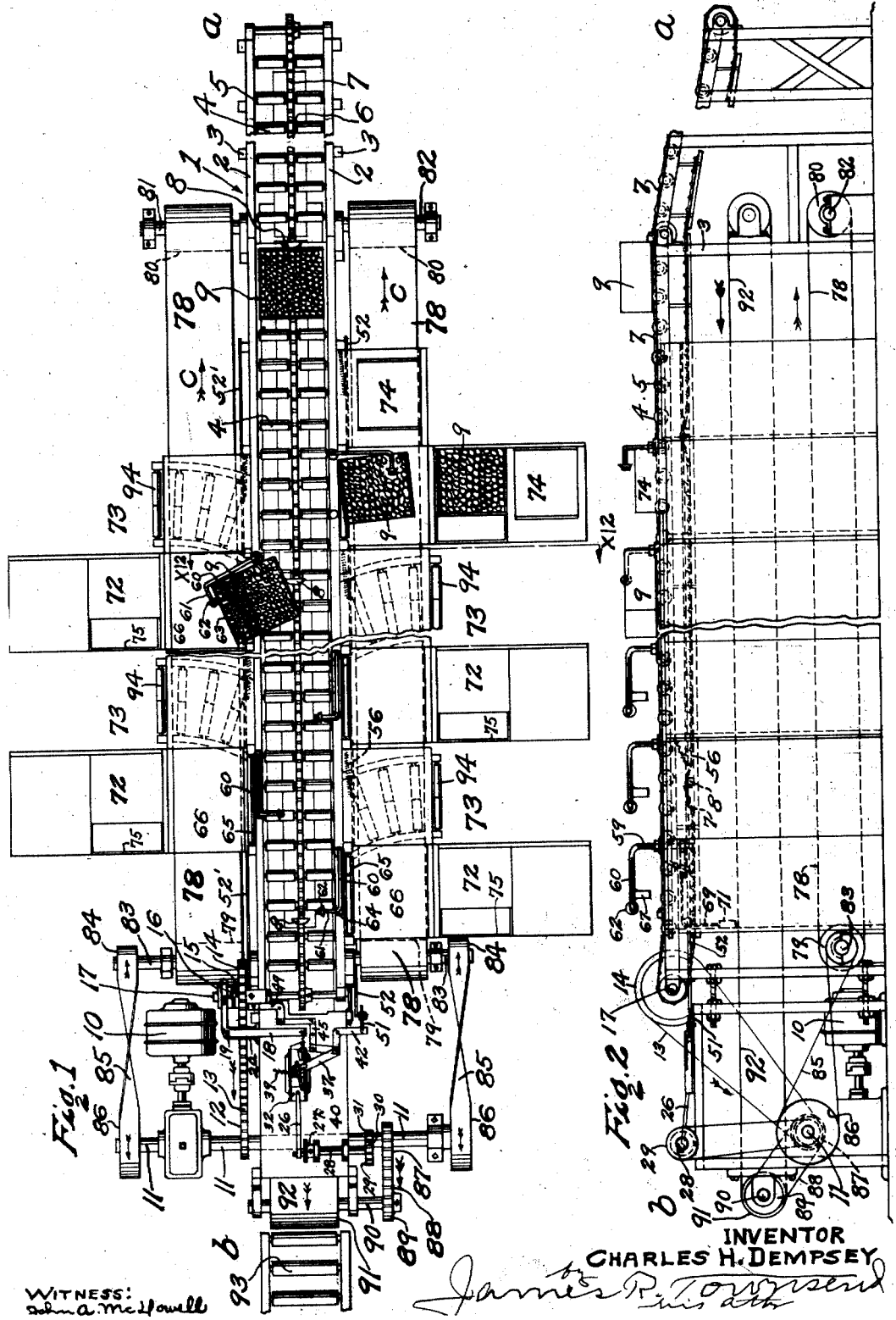

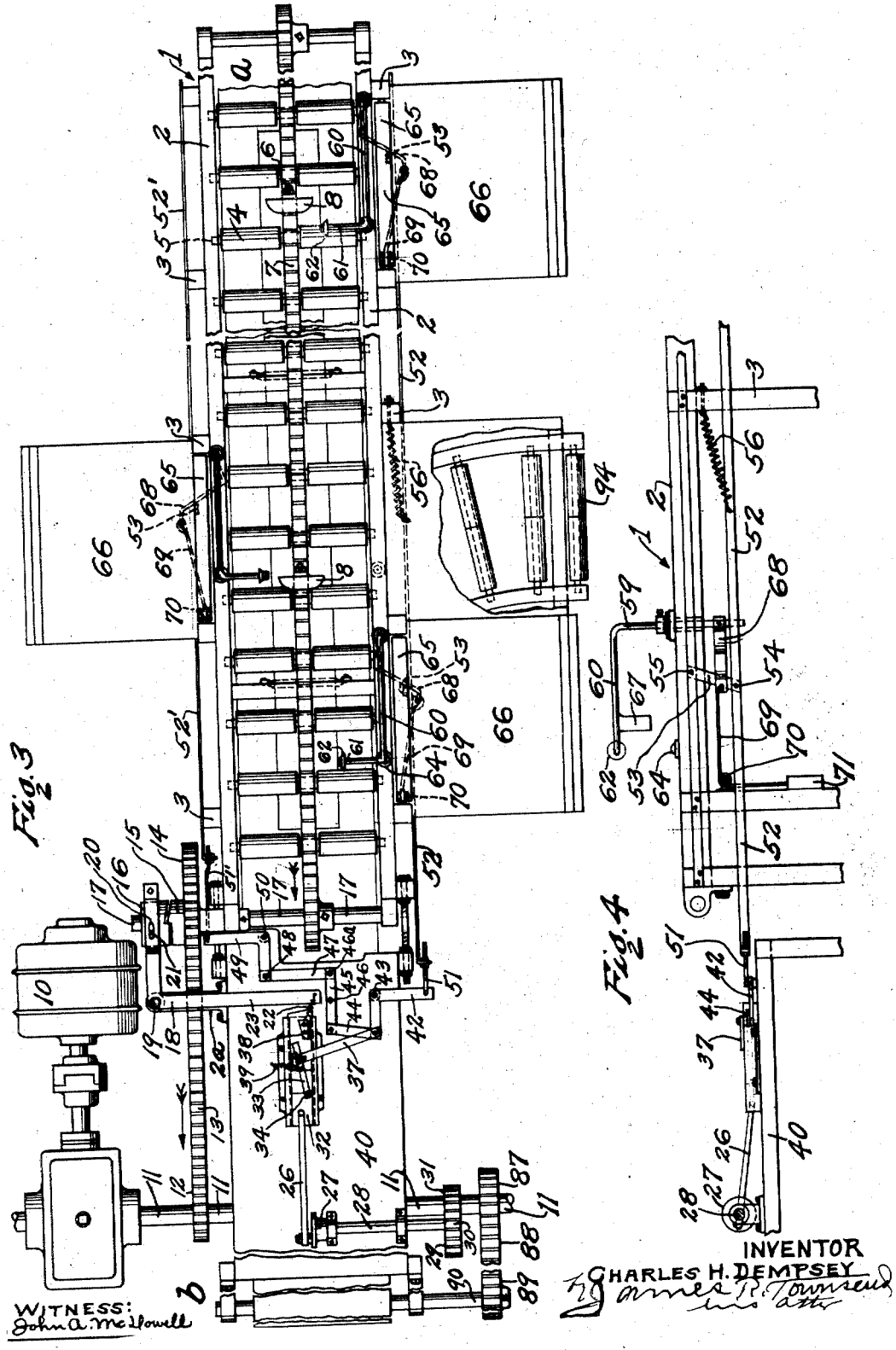

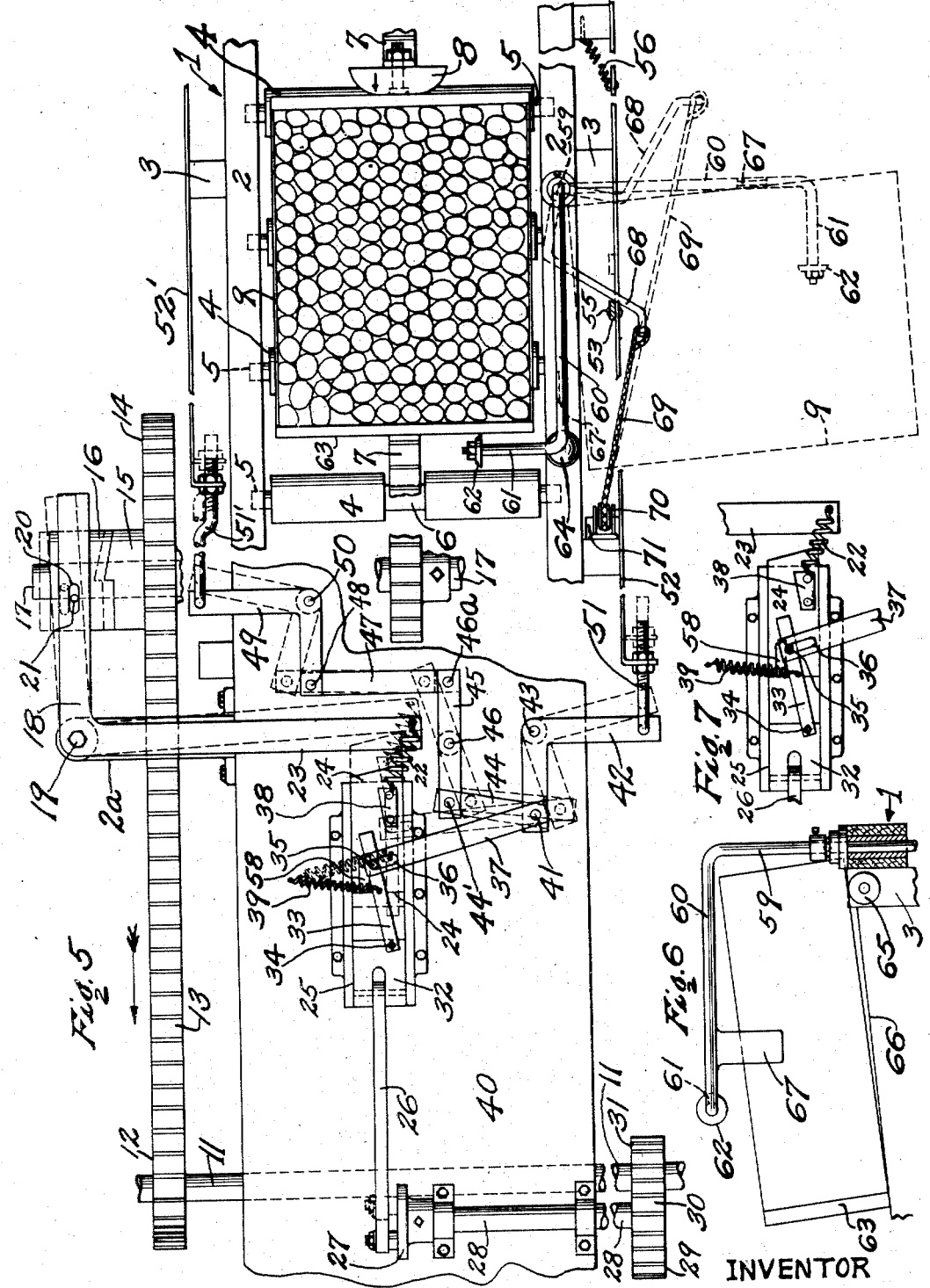

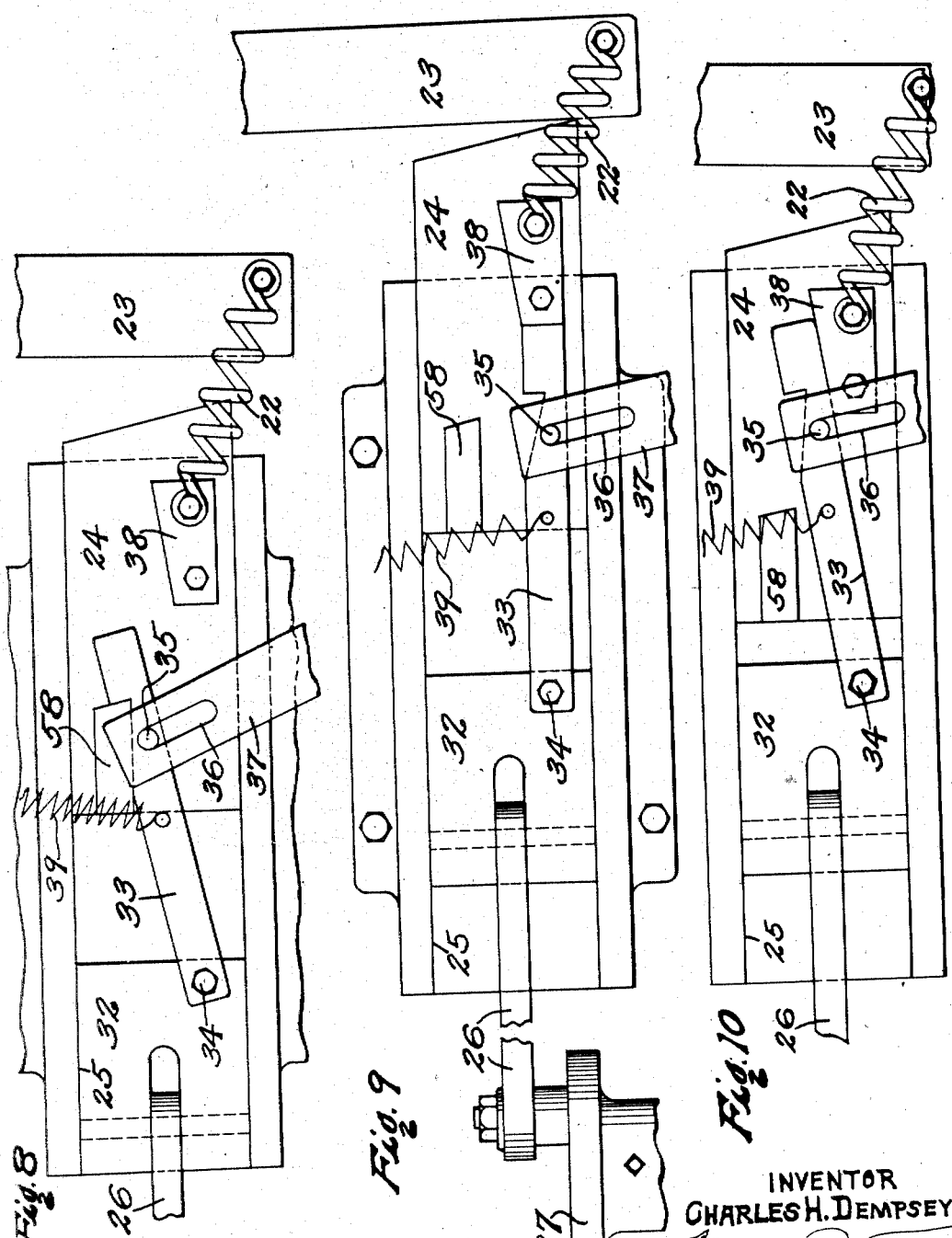

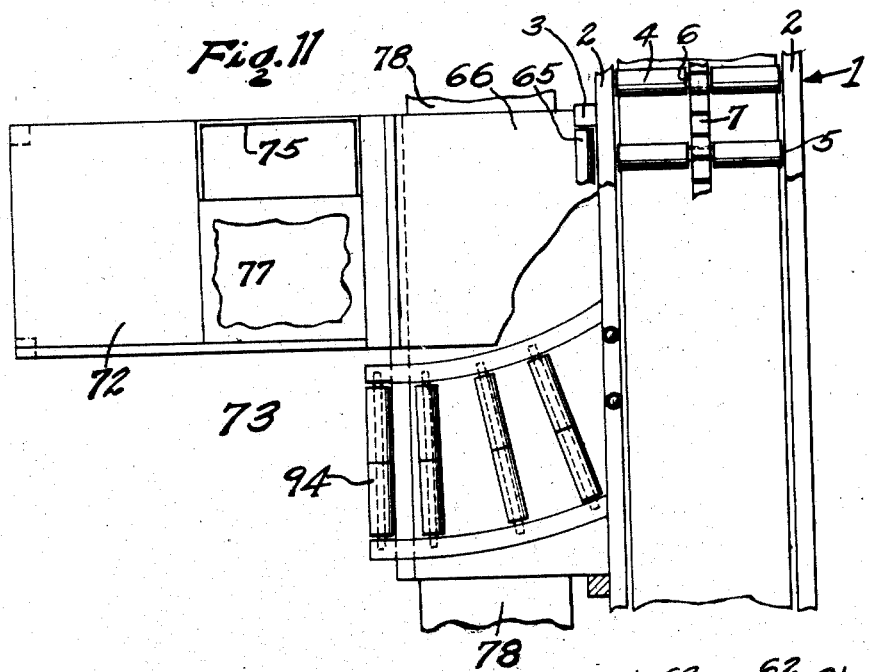
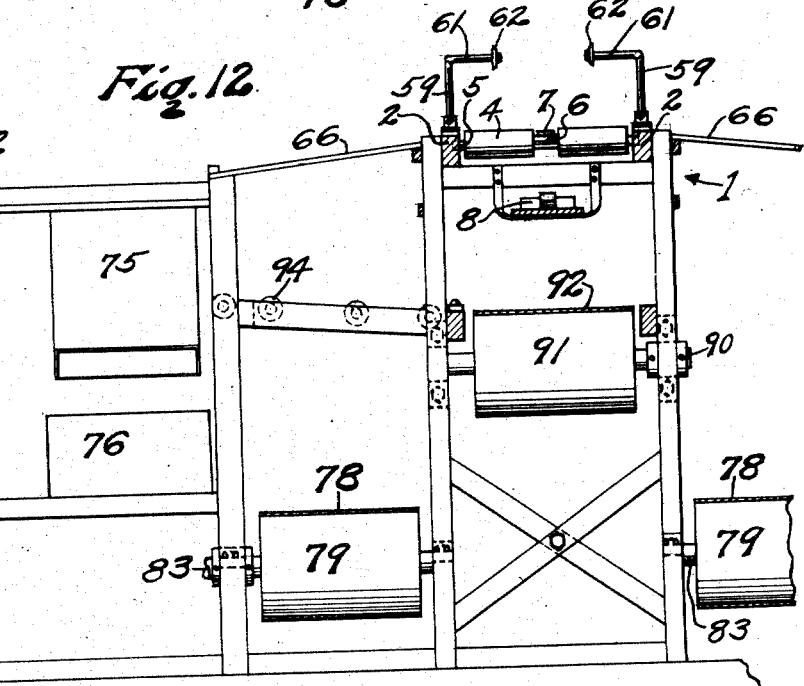

1,710,969

UNITED STATES PATENT OFFICE.

CHARLES H. DEMPSEY, OF LOS ANGELES, CALIFORNIA, ASSIGNOR OF ONE-HALF TO WILL H. HARTWELL, OF LOS ANGELES, CALIFORNIA.

BOX DISTRIBUTOR FOR FRUIT PACKERS' CONVEYERS.

Application filed January 19, 1927. Serial No. 162,068.

In fruit packing houses it is customary to deliver fruit in field boxes to a considerable number of graders and packers, who take the fruit from the field boxes and pack it in different shipping boxes according to grade; and it is customary to provide a conveyer of considerable length, alongside which the packers are stationed; and the field boxes are placed on the conveyer at one end thereof and are moved along thereon to supply the packer at the different stations; and each packer removes from the conveyer to his station, field boxes, one at a time, and distributes the fruit therefrom to shipping boxes and cull boxes according to grade.

The work of moving the loaded boxes from the conveyer to the stations involves the expenditure of considerable time and labor, and an object is to accomplish such work automatically and expeditiously.

This invention is broadly new, basic and pioneer in that it comprises means whereby the field boxes are automatically delivered at all unsupplied distributing stations alongside the endless conveyer to which the field boxes are supplied; the field boxes are delivered to the side stations without stopping the conveyer or any of the boxes thereon; and after each field box is removed from its delivered position, the delivering device is automatically returned to receive another field box for delivery to such station, and the conveyer continues to move as long as any station is vacant, and stops when all the stations are supplied, and automatically starts when any box is removed by a grader or packer.

An object of this invention is to provide for making the delivery as stated by positive mechanical means and without the use of electric devices for effecting such delivery or for resetting the delivery mechanism.

The invention is also broadly new, basic and pioneer in that I provide in combination with a stationary way and journalled rollers extending transversely of the way to support the boxes and allow them to pass antifrictionally along the way, an endless sprocket chain having attachment links with projecting pushers to push the field boxes along the way on the anti-friction rollers; and I provide said rollers with centrally arranged annular grooves to chamber the sprocket chain so that it will be held from displacement from the center line of the way.

The invention is broadly new, basic and pioneer in that it comprises in combination with a way, and means in the form of pushers on an endless chain to move a box along such way, and horizontally swinging means at one edge of said way adapted to receive the front end of a box forcibly moved along said way, and to deflect said box to the side of the way and withdraw it from the means by which the box was moved along the way, and to bring the box to rest out of the path of such box moving means and out of the path of box travel, so that the power that moves the boxes along the way is also applied to shift the boxes out of the way.

The invention is furthermore broadly new, basic and pioneer in that the means to move the box along the way is driven by power applied to such means through a clutch that comprises a shiftable member which is connected through suitable means for operation by the box deflecting means, so that when a box is deflected, it operates to cause the power to shift the shiftable clutch member to released position so that the power is no longer applied to drive the box moving means, whereby said box moving means will remain stationary until set in motion by return of said swinging means to box receiving position or by the operation of other means; and in further carrying out the invention, provision is made whereby the power that drives the clutch is also applied to shift the shiftable clutch member into clutching position to operate the box movers to again move boxes along the way, irrespective of out-swung box swinging devices.

In this invention the box deflecting means is a horizontally swinging arm on a vertical shaft journalled at the side of the way and that forms a fulcrum on which the box will be sufficiently revolved by pressure of the box moving device or pushers; and said box deflecting means are connected through intermediate means, to means adapted to be operated by the power to shift the shiftable clutch member into and out of clutching position.

The invention also includes the mechanism and parts of mechanism through which the power is applied to move the shiftable clutch member.

Further objects of the invention are simplicity, cheapness and ease of construction, minimum floor space occupied by the apparatus and attendants; freedom from getting out of order; and fool proofing so that unskilled workmen and packers can operate the apparatus and keep it in repair.

Other objects, advantages and features of invention may appear from the accompanying drawings, the subjoined detailed description and the appended claims.

The accompanying drawings illustrate the invention.

Figure 1 is a broken plan view of the invention as it would appear in operation with boxes of fruit to be distributed to operatives, not shown.

Fig. 2 is a broken side elevation projected from Fig. 1, except that details of framework are omitted.

Fig. 3 is an enlarged fragmental plan of parts shown in Figs. 1 and 2.

Fig. 4 is a broken detail in side elevation, of parts shown in Fig. 3.

Fig. 5 is a broken enlarged plan detail, illustrating the box removing mechanism and the mechanism for controlling the box moving mechanism.

Fig. 6 is a detail elevation of a part of the box removing mechanism and a box thereby removed to the side of the box way, a fragment of the frame of which is shown in section.

Fig. 7 is a plan detail of mechanism shown in Fig. 5, omitting the dotted position for clearness.

Fig. 8 is an enlarged plan detail of the lost motion clutch shifting device in position for holding the clutch members in engagement with each other to operate the box moving mechanism.

Fig. 9 is an enlarged plan detail of the mechanism shown in Fig. 8 with the latch shifted into position indicated in broken lines in Fig. 5 to shift the loose clutch member from clutch engaging position to stop the application of power to the box moving mechanism.

Fig. 10 is a view analogous to Fig. 9 showing the position of the latch when it is riding without shifting the clutch operating lever.

Fig. 11 is a plan detail of the lower portion of the apparatus at a packing station, illustrating the arrangement for delivering packed boxes from the station to a belt conveyer that delivers the box to the "lidder" not shown, where the covers may be put on the boxes ready for shipping.

Fig. 12 is a sectional elevation substantially at line $x^{12}$, Fig. 1, without the boxes; so that the deflectors are at rest position as in Fig. 3.

The field-box way 1, comprises a frame having side rails 2 carried by suitable supports as the posts 3 and extending from the receiving end $a$ toward the power end $b$. Rollers 4 are journaled by pins 5 in the frame and extend at right angles to the way and are provided between the ends with grooves 6 to accommodate the box moving sprocket chain 7 which is provided with pushers 8 adapted to move field boxes 9 along the way 1. 10 is a motor which may be of any suitable type, arranged to drive a shaft 11 that is connected by a sprocket wheel 12, sprocket chain 13, and sprocket wheel 14, to drive a clutch member 15 continuously. 16 is a shiftable clutch member mounted to revolve with a driven shaft 17 and slidable on said shaft to be engaged with and disengaged from the continuously running clutch member 15. 18 is a bell crank fulcrumed at 19 to an extension $2^a$ of the frame, and connected by a lost motion connection indicated by the slot 20 and pin 21, to the shifting clutch member 16, and movable by a spring 22 into position to move the clutch into operating position as indicated in Fig. 5.

The spring 22 yieldably connects the long arm 23 of the clutch operating bell crank 18 to a slide 24 that is shiftable by power from shaft 11, and said spring is sufficiently strong to shift the clutch from its retracted position shown in broken lines in Fig. 5 to the cultching position shown in solid lines in said Fig. 5 when said slide 24 is slid forward. Power operated lost motion slide shifting means are provided to move the slide forward and back to shift the clutch and to allow it to rest stably for an indefinite time at either position, by its own inertia.

Said slide 24 is mounted in a slideway 25 and is adapted to be connected by slide shifting means, to a connecting rod 26 operable by a crank 27 mounted on a shaft 28 having a sprocket wheel 29 connected by a sprocket chain 30 with a sprocket wheel 31, that is fixed to the power shaft 11 and is constantly driven thereby.

32 is a slide mounted in said slideway 25 and connected to the connecting rod 26 and thereby continuously reciprocated forward and back. Said slide 32 is adapted to operate a reversing latch 33 that is pivoted by a pivot 34 to the slide 32 and that is oscillatable by lost motion means comprising a pin 35 fixed to the latch 33 and extending into a slot 36 in a latch shifting rod 37, which is operable endwise to cause the ends of its slot to engage the pin 35 to shift the latch 33 from the slide advancing and clutch seating position shown in solid lines in Figs. 5 and 8, into position to engage the rear end of a thrust block 38 fixed to the slide 24; so that when the latch 33 is in position to engage the thrust block, said slide 24 will be thrust back by the latch to shift the bell crank arm 23 into the position shown in broken lines in Fig. 5 to shift the bell crank 18 to release the clutch.

A latch spring 39 yieldingly holds the latch 33 against a strike 58 on the slide 24, so that on the first forward stroke of the connecting rod 26 and the slide 32 after the latch 33 is brought by spring 39 into the solid line position in Fig. 5, the latch 33 will draw the slide 24 forward to the said solid line position and the clutch into gear or clutched position where the clutch will remain by its own inertia until the latch 33 is drawn against the opposition of the spring 39, to engage the forward end of the block 38 on slide 24 to force the slide 24 back to the broken line position in Fig. 5, thus releasing the clutch.

The clutch and bell crank 18 remain in released position through their own inertia, and the spring 22 holds the slide 24 back so that the latch 33 is simply moved toward and from the block 38 without moving slide 24.

By this lost motion contrivance the power from the motor may be instantly applied to shift the clutch from open to closed position, and at another instant, from closed to open position, and such shiftings are caused by forward and back movements of the box operated shifting rods 52 and 52'.

The slotted latch operating connecting rod 37 is oscillatable so that the latch 33 may be freely reciprocated by the slide 32, without moving the slide 24 except at the initial forward or backward movement and therefore the endless chain and its pushers will be driven when the clutch is closed, until the connecting rod 37 is drawn down to shift the latch into position in front of the block 38, and then the initial backward movement of the slide 32 will cause the latch to shove the block 38 and its slide 24 back to shift the bell crank arm 23 and release the clutch, as shown in broken lines in Fig. 5, thus allowing the shaft 17, the sprocket chain 7 and pushers 8 and whatever boxes are on the way, to come to rest, and to so remain until the connecting rod 37 is pushed up to bring latch 33 into position to engage the strike 58, whereupon the initial forward movement of the latch 33 draws the strike 58 and the slide 24 forward to move the clutch into closed position whereupon the endless chain and pushers again operate as before.

The latch 33, strike 58, slide 24, spring 22 and bell crank 18 are constructed and arranged so that a tension of spring 22 is constantly maintained to hold the slide 24 toward the bell-crank arm; and said spring serves as a buffer to accommodate the engaging movement at the clutch faces.

It is thus seen that unless one of the push rods is shoved forward, the springs 56 retract them both, thus holding the parts in the position indicated in broken lines in Fig. 5 so that the motor can run indefinitely without driving the shaft 17 and the box moving sprocket chain 7.

The slideway 25 is rigidly attached to a portion 40 of the frame of the machine and the latch operating connecting rod 37 is pivoted by a pivot 41 to a primary bell crank 42 that is pivoted by a pivot 43 that is in fixed relation to the frame of the machine. Such latch connecting rod 37 is also pivoted by said pivot 41 to a link 44 that is pivoted by pivot 44' to a lever 45 fulcrumed to the frame at 46 and pivoted by a pivot 46ª to an intermediate connecting rod 47 that is pivoted by a pivot 48 to a second primary bell crank 49 that is pivoted on a pivot 50 fixed to the frame.

The primary bell cranks 42 and 49 are connected respectively by adjustable connections 51 and 51' to push rods 52 and 52' so that when either push rod 52 or 52' is moved forwardly endwise, the latch connection 37 will be operated to move the latch 33 into continuously reciprocating position to shift the slide 24 forward, thereby to operate the arm 23 and to draw the clutch member 16 into position to engage the clutch 15, as shown in solid lines in Fig. 5.

The push rods 52, and 52' are swung on hangers 53 to the lower ends of which they are pivoted by pins 54; the upper ends of the hangers being pivoted to the frame by pivots 55 respectively. Springs 56 constantly tend to retract the push rods 52 to move the bell cranks 42 and 49 from the position shown in solid lines in Fig. 5 to the position shown in broken lines, and in this position the latch operating rod 37 draws the latch 33 from the strike 58 into engagement behind the block 38 so that on the forward reciprocation of the slide 32, the slide 24 will be pushed forward into the broken line position in Fig. 5, thus shifting the clutch bell crank 18 into the clutch releasing position shown in broken lines in said Fig. 5, where the inertia of the clutch and the clutch bell crank causes the clutch to remain released until the push rod is again shoved forward.

The box deflector or means for shifting the field box from the way, is in the form of a crank comprising an upright shaft 59 having at its upper end an arm 60 adapted in one position to extend along the way toward the direction of box movement a distance somewhat over one-half the length of a field box. The forward end of said arm is provided with a limb 61 on which is journalled a sharp edged box deflecting blade shown as a disk roller 62 adapted to receive and engage the advanced end 63 of a field box 9, thus moved by the pusher 8, so that when the field box 9 engages the disk roller 62, the field box can only move by pushing disk roller 62 out of the way. The sharp edge of said roller engages the box to prevent the box from pushing the roller aside to let the box slide past it.

The roller 62 in its box intercepting position is intermediate the side of the box-way and the path of the box pushers 8 which extend equally on opposite sides of the mid-line of the box-way so that when the pressure of the pusher 8 acts upon the rear end of the box while the front end of the box is in engagement with the disk roller 62, the resolution of forces is such that the box is turned and swung on a center formed by shaft 59, and the arm 60 is swung out until the limb 61 is parallel to the box-way, as indicated in broken lines in Fig. 5.

Anti-friction means in the form of an inverted ball caster 64, is set in the frame of the way to support the front end of the revolved box so that the initial movement of the box toward removal from the transverse rollers 4 is practically without friction.

65 is a roller in practical parallelism with the way and close to the edge thereof, over which the box is swung as the pusher 8 revolves the box off of the transverse rollers of the way. Said roller 65 is at a lower level than the ball caster, and than the transverse rollers of the way, so that when the box has been revolved sufficiently to escape from the transverse rollers and from the ball caster, the rear end of the box rolls on the longitudinal side roller 65, and the box comes to rest on a stationary box support as the station platform 66 or shown as a shelf at the side of the way over which the arms 60, 61 and roller 62 swing as the box is swung from over the way; and the front end of the delivered box comes to rest upon such shelf while the rear end rests upon the roller 65 as indicated in Fig. 6.

The top of the shelf 66 is at a level sufficiently low to allow the front end 63 of the box to drop below the level of the arm 60, limb 61 and disk roller 62.

The arm 60 is provided with a downwardly extending lug 67 that is adapted to engage that side of the box which is rearward when the box is at rest on the side roller 65 and shelf 66, thus to prevent the arm 60 from being moved toward the way while the box is on the shelf, and to prevent the arm 61 and the disk roller 62 from reaching a position over the way so that so long as the field box is at rest on the shelf 66; field boxes on the way may freely pass the station at which the delivered box is at rest.

The box deflector shaft 59 is provided at its lower end with a push rod operating tappet 68 which is normally held by yielding means as the line 69 trained over a pulley 70 and provided with a weight 71 so that when the delivered box is drawn out of the way of the lug 67, the weight 71 causes the deflecting crank to swing back into box intercepting position across the way, and causes the tappet 68 to act upon the block 53 to push the push rod as at 52 or 52', as the case may be, forward against the tension of the rod retracting springs 56, to the solid line position shown in Fig. 5, so that the clutch is moved to the initial position shown in solid lines in said Fig. 5.

It is thus seen that when the deflector arm is drawn out of box deflecting position, it does not interfere with the retraction of the push rod, but that if any tappet 68 is in box deflecting position as in solid lines in Fig. 5, the clutch will be closed, that is, will be in gear, but when all the deflector arms on both sides of the way are swung out, the clutch will be disengaged and the box-moving chain will stop, without any interference with the rest of the machinery. In practical operation, the field boxes may be put onto the receiving end of the box-way, and they will be continually moved by the pushers along said way, the first one being deflected by the first deflecting arm, and so on; the pushers may move until all the boxes have been deflected, thus holding all the tappets 68 retracted from their respective hangers 53, thus allowing the springs 56 to retract the push rods, thus retracting the bell cranks to the broken line positions of Fig. 5, and releasing the clutch, the endless chain will stop; but the moment any box is pulled off of the roller 65 thus releasing the lug 67 and allowing the weight 71 to pull a tappet 68 forward to move the hanger forward to operate the push rod and the bell cranks, and to swing the limb 61 into box intercepting position, the clutch is again thrown in gear and the chain starts to supply that particular station with a box, and this is true of every station, so long as any station is needing a box, the chain will be run to supply that station with a box, and when all the stations are supplied the chain stops running.

At the outer edge of the shelf 66 and at about the same level, there is provided a table 72 of sufficient size to accommodate a field box 9 and a shipping box 74; and the operator in the standing space 73 beside the table and way will place a shipping box at the outer end of the table 72 and will draw from the shelf 66 onto the table 72 the filled field box 9, thus releasing the lug 67 and allowing the arm 60 to swing into position to intercept another box and deflect it onto the shelf 66. The packer and grader picks the fruits from the field box, placing the shipping fruit in a shipping box 74 and dropping the culls through a cull chute 75 into a cull box 76 placed on the lower support 77 underneath the table 72.

78 indicates cull box carrying belts which are trained over pulleys 79 and 80 that are mounted in pairs on shafts 81, 82 and 83; and the top limbs of said belts run rearwardly in the direction of the arrows c in Fig. 1 to deliver the boxes of culls to that end of the apparatus at which the field boxes are delivered to the way.

The pulleys 79 are fixed to shafts 83 to which are fixed pulleys 84 that are driven by crossed belts 85 that are trained over pulleys 86 fixed to opposite ends of the continuously running shaft 11 so that the shaft 82 and the cull belts 78 run continuously to carry the culls back to the rear end of the apparatus from which they can be loaded onto trucks and carried away.

A sprocket wheel 87 is fixed to the continuously running shaft 11 and drives a sprocket chain 88 trained over a front sprocket wheel 89 that is fixed on a shaft 90 on which is mounted a pulley 91 over which is trained the front end of a belt 92.

By the arrangement shown, the continuously revolving shaft 11 drives the top limb of the belt 92 forwardly to deliver boxes onto idler rollers 93 which lead to the station, not shown, of the lidder.

94 indicates inclined anti-friction runways leading from the grader station at 73 to the belt 92, so that the grader at the station 73 can take the boxes of graded fruit from the table and place them on the inclined runway and the boxes will then be moved by gravity onto the belt and from the belt over the idler rolls 93 to the lidder without attention of the grader.

The sharp edged disk 62 is journalled to revolve on the limb 61 so that when the limb has come into contact with the end of the box, and cuts into the box and swings around to deliver the box over the edge of the way onto the stationary box support, the disk will revolve so as to be easily disengaged from the box when the packer or grader pulls the box from the disk.

I claim:

1. The combination with power mechanism; of a carrier; mechanism for moving the carrier; a clutch for connecting and disconnecting the carrier moving mechanism to and from the power mechanism and mechanism operable by an object carried by the carrier to apply power from the power mechanism to move the clutch, to disconnect the power mechanism from the carrier.

2. The combination with a way and mechanism adapted to move boxes along the way; of power means; a clutch adapted, when in gear, to transmit power from the power means to operate such box moving mechanism; means to deflect a box from the way as the box is moved by the box moving mechanism; lost motion mechanism to shift the clutch; and means operable by the deflected box to operate the lost motion mechanism to cause it to shift the clutch out of gear.

3. The combination with a way and mechanism adapted to move boxes along the way; of power means; a clutch adapted, when in gear, to transmit power from the power means to operate such box moving mechanism; means to deflect a box from the way as the box is moved by the box moving mechanism; lost motion mechanism to shift the clutch; means operable by the deflected box to operate the lost motion mechanism to cause it to shift the clutch out of gear; and means to automatically shift the clutch into gear.

4. In a box-distributor having a way; a source of power; mechanism for moving boxes along the way; a clutch for connecting and disconnecting the box moving mechanism to and from the power source; and means adapted and arranged to be operable by a box while it is being moved by the box moving mechanism, to apply power from the power source to disconnect the clutch.

5. The combination with a way and a power source adapted to move boxes along the way, of a continuously revolving clutch member driven by the power source; a shiftable clutch member; power driven mechanism adapted and arranged to be driven by the shiftable clutch member when such clutch member is being driven; reciprocating means connected to and driven by the power source; a double acting latch; means connected to the shiftable clutch member to shift said clutch member; said means being operable in one direction by the latch to shift the shiftable clutch member out of clutching position; said means being operable by the latch to shift the shiftable clutch member into clutching position; and automatic means operable by the boxes on the way to shift the latch from one to the other of the clutch shifting means, and vice versa.

6. The combination with power means, of latch operating means reciprocated by the power means; a box way; an endless chain provided with pushers and adapted and arranged to move boxes along such way; mechanism adapted to be operated by the power means to drive said endless chain to move boxes along the way; a continuously revolving clutch member operable by the power means; revolving means to drive the endless chain; a clutch member fixed to said revolving means and adapted to be shifted toward and from the continuously moving clutch member; box deflecting means adapted and arranged to be acted upon by a box as the same is moved along the way by a pusher; lost motion means operable by the box deflecting means to apply power from the power reciprocated means to operate the clutch shifting means to cause the shiftable clutch member to engage the continuously moving clutch member at one position and to release the clutch at another position of the clutch shifting mechanism.

7. The combination with a way along which boxes may be moved; of means for pushing boxes along the way; an arm at one side of the way adapted to oscillate on a vertical axis located at one side of the way; said arm having a limb adapted to extend across the way to intercept a box moving along the way; said limb being adapted to receive the impact of a box as it is moved along the way by a pusher and to swing laterally in response to the pressure of the box upon said limb; said limb being adapted to engage the box between the pusher at that side of the way at which said axis is located so that the resolutions of forces is such that the box will be swung off of the way by continued action of the pusher.

8. The combination with a way and a station at the side of the way; of an arm adapted and arranged to oscillate upon an axis on the same side of the way as the station; means to push a box along the way, said arm being provided with a member adapted and arranged to receive the impact of the box and to be swung from over the way by said box and to engage the box and cause the box to swing laterally from the way onto the station as the pusher moves past such station.

9. The combination with a way and means to move a box along the way, of an arm adapted and arranged to normally extend along the way and provided with a member adapted and arranged to project across the way to receive a box moved along the way. means to yieldingly hold the arm with its member in box receiving position; and a station at the side of the way onto which the box may be brought to rest as the member is swung over the station; said arm being provided with a downwardly extending lug adapted and arranged to be intercepted by the box when the same is on the station to contact with the box and prevent the arm from being returned to position with its member in the way of said box.

10. The combination with a way; of a source of power; mechanism to move a box along the way; a clutch to connect such mechanism with the source of power; an arm adapted to oscillate on an axis at one side of the way and to receive a box moving along said way and provided with means to frictionally engage the box so that as the arm is oscillated by the box it will swing the box off of the way; means to yieldingly hold the arm in box receiving position; a push rod connected to the arm; means to retract the push rod; means whereby the push rod when retracted will throw the clutch out of gear.

11. The combination with an anti-friction way, of a pulley adjacent said way; a belt trained around said pulley; means to drive the pulley to move the top limb of the belt toward the anti-friction way, and means operable in connection with the belt to deliver boxes, one at a time, to the top limb of the belt.

12. The combination with a way and means for moving boxes along the way in one direction. of a belt at the side of the way; means to move the belt in a direction reverse to that in which the boxes are moved on the way; a belt below the way; and means to move the upper limb of the lower belt in the same direction as the boxes are moved along the way.

13. The combination with a way, and means for moving boxes along the way in one direction; of a belt at the side of the way; means to move the belt in a direction reverse to that in which the boxes are moved on the way; a belt below the way; means to move the upper limb of the lower belt in the same direction as the boxes are moved along the way; and means passing over the reverse belt to deliver boxes to the belt that runs in the same direction as the boxes on the way.

14. A box distributor for fruit packers, comprising a support on which boxes may be placed; a way; means for moving boxes forwardly along the way; means for moving boxes from the way onto the support; a conveyer for moving boxes toward the direction from which the boxes are moved along the way; a belt underneath the way; means to move the upper limb of said belt in the same direction as boxes are moved along the way; and an anti-friction incline extending over the rearwardly moving belt limb to deposit boxes on to the upper limb of the forwardly moving belt.

15. The combination with a box way and pushers to move a box along the way; of an arm at the side of the way, journalled on an upright axis and provided with a limb adapted to extend partly across the way; means to yieldingly hold said arm in position with said limb transversely of the way; and a blade on the limb to engage the box which is being moved along the way to deflect the box and swing it across the edge of the way.

In testimony whereof, I have hereunto set my hand at Los Angeles, California, this 9th day of December, 1926.

CHARLES H. DEMPSEY.